United States Patent
Bates et al.

(10) Patent No.: US 12,469,275 B2
(45) Date of Patent: Nov. 11, 2025

(54) SYSTEMS AND METHODS FOR AUTOMATICALLY EXTRACTING OBJECTS FROM IMAGES

(71) Applicant: Worlds Enterprises, Inc., Colleyville, TX (US)

(72) Inventors: Ross Bates, Dallas, TX (US); Paul Aarseth, Murphy, TX (US)

(73) Assignee: Worlds Enterprises, Inc., Colleyville, TX (US)

( * ) Notice: Subject to any disclaimer, the term of this patent is extended or adjusted under 35 U.S.C. 154(b) by 0 days.

(21) Appl. No.: 18/955,602

(22) Filed: Nov. 21, 2024

(65) Prior Publication Data

US 2025/0166370 A1     May 22, 2025

Related U.S. Application Data

(60) Provisional application No. 63/602,104, filed on Nov. 22, 2023.

(51) Int. Cl.
| | |
|---|---|
| *G06V 10/88* | (2022.01) |
| *G06T 7/194* | (2017.01) |
| *G06V 10/44* | (2022.01) |
| *G06V 10/46* | (2022.01) |
| *G06V 10/74* | (2022.01) |
| *G06V 10/762* | (2022.01) |
| *G06V 20/40* | (2022.01) |

(Continued)

(52) U.S. Cl.
CPC .............. *G06V 10/88* (2022.01); *G06T 7/194* (2017.01); *G06V 10/457* (2022.01); *G06V 10/46* (2022.01); *G06V 10/761* (2022.01); *G06V 10/762* (2022.01); *G06V 20/40* (2022.01); *G06V 20/46* (2022.01); *G06V 20/52* (2022.01); *H04N 23/631* (2023.01)

(58) Field of Classification Search
CPC ...... G06V 10/88; G06V 10/457; G06V 20/40; G06T 7/194; H04N 23/631
See application file for complete search history.

(56) References Cited

U.S. PATENT DOCUMENTS

| | | | |
|---|---|---|---|
| 8,990,589 B1 * | 3/2015 | Kazarkin | G06F 21/62 |
| | | | 713/193 |
| 10,242,710 B2 * | 3/2019 | Abramson | G06V 20/49 |
| 10,533,850 B2 * | 1/2020 | Abovitz | A63F 13/213 |

(Continued)

*Primary Examiner* — Mia M Thomas
(74) *Attorney, Agent, or Firm* — Whitaker Chalk Swindle & Schwartz PLLC; Bradley J. Birchfield

(57) ABSTRACT

A method for identifying and extracting objects from a video frame includes accessing a video frame of a video. The method further includes analyzing the video frame to generate a plurality of masks. Each mask includes neighboring pixels that are determined to be related. The method further includes extracting a plurality of objects from the video frame based on the generated plurality of masks. The method further includes recursively extracting a plurality of nested objects from the video frame based on the generated plurality of masks. The method further includes creating a plurality of object images by combining the plurality of masks of the plurality of objects with image data of the video frame and combining the plurality of masks of the plurality of nested objects with the image data of the video frame. The method further includes displaying the plurality of object images in a graphical user interface.

20 Claims, 11 Drawing Sheets

(51) Int. Cl.
   *G06V 20/52*            (2022.01)
   *H04N 23/63*            (2023.01)

(56)                References Cited

U.S. PATENT DOCUMENTS

| | | | |
|---|---|---|---|
| 11,049,302 B2* | 6/2021 | Lowery | H04N 5/2621 |
| 11,328,513 B1* | 5/2022 | Osherovich | G06V 40/168 |
| 11,527,078 B2* | 12/2022 | Littman | G06T 7/90 |
| 11,587,323 B2* | 2/2023 | Israel | G06V 40/172 |
| 12,056,791 B2* | 8/2024 | Agrawal | G06F 16/53 |
| 12,155,887 B2* | 11/2024 | Seol | G06V 10/945 |
| 2015/0346954 A1* | 12/2015 | Parag | G06F 3/04842 |
| | | | 715/763 |
| 2017/0068847 A1* | 3/2017 | el Kaliouby | H04N 21/252 |
| 2019/0163866 A1* | 5/2019 | Liu | G06F 30/20 |
| 2019/0347803 A1* | 11/2019 | Lim | G06T 7/11 |
| 2020/0196015 A1* | 6/2020 | Pate | G06V 10/82 |
| 2021/0004644 A1* | 1/2021 | Shiraishi | G06Q 20/203 |
| 2021/0185392 A1* | 6/2021 | Xu | H04N 21/8146 |
| 2021/0241540 A1* | 8/2021 | Shore | G06F 16/54 |
| 2021/0248427 A1* | 8/2021 | Guo | G06V 10/82 |
| 2021/0366952 A1* | 11/2021 | Retterath | H10F 39/107 |
| 2022/0148315 A1 | 5/2022 | Blott et al. | |
| 2022/0191521 A1* | 6/2022 | Ferrara | H04N 19/33 |
| 2022/0230306 A1* | 7/2022 | Shaked | G06T 7/0012 |
| 2023/0110558 A1 | 4/2023 | Liu et al. | |
| 2023/0403480 A1* | 12/2023 | Retterath | H04N 25/713 |
| 2023/0419526 A1* | 12/2023 | Lianos | G06T 7/50 |
| 2024/0046765 A1 | 2/2024 | Parvu et al. | |
| 2024/0087282 A1* | 3/2024 | Young | G06V 10/25 |
| 2024/0155132 A1* | 5/2024 | Maurer | H04N 19/14 |

* cited by examiner

SYSTEMS AND METHODS FOR AUTOMATICALLY EXTRACTING OBJECTS FROM IMAGES

PRIORITY

This application claims the benefit, under 35 U.S.C. § 119(e), of U.S. Provisional Patent Application No. 63/602,104, filed Nov. 22, 2023, the entirety of which is herein incorporated by reference for all purposes.

TECHNICAL FIELD

This disclosure generally relates to object recognition in images, and more specifically to systems and methods for automatically extracting objects from images.

BACKGROUND

Object recognition in the field of computer vision involves identifying and labeling objects that are depicted in images and videos. For example, objects in a video captured by a security camera may be manually labeled by a user in order to train a computer vision model. Ideally, images such as the frames of a video can be processed by a system so that all objects within the images may be identified and labeled with 100% accuracy. However, current systems and methods for identifying and labeling objects in images are not always accurate, may be slow, may be performed manually by a person, or may require excessive computer resources.

SUMMARY

The present disclosure achieves technical advantages as systems, methods, and computer-readable storage media for automatically identifying and labeling objects in images. The functionality for automatically identifying and labeling objects in images may include utilizing an extraction module, a clustering module, and an indexing module. The extraction module analyzes images (e.g., video frames from video cameras) in order to automatically identify and extract objects from the images. The clustering module groups the identified objects from the images into groups based on similarity. The indexing module indexes the identified objects into an index that may be used to automatically identify future objects across multiple physical locations.

In some embodiments, the present disclosure provides for a system integrated into a practical application with meaningful limitations that may include analyzing video frames of a video in order to generate a plurality of masks and extracting a plurality of objects from the video frame based on the generated plurality of masks. Other meaningful limitations of the system integrated into a practical application include creating a plurality of object images and displaying one or more of the plurality of object images in a graphical user interface.

A technical improvement of the features provided herein includes automatically identifying and labeling objects in images. This process contributes to the overall efficiency of the operations of an image processing system.

The present disclosure solves the technological problem of a lack of technical functionality for labeling objects in images by providing methods and systems that provide functionality for automatically identifying and labeling objects in images using various modules. The technological solutions provided herein, and missing from conventional systems, are more than a mere application of a manual process to a computerized environment, but rather include functionality to implement a technical process to supplement current manual solutions for labeling objects in images by providing a mechanism for optimally and automatically identifying and labeling objects in images. In doing so, the present disclosure goes well beyond a mere application the manual process to a computer.

Unlike existing solutions where personnel may be required to manually view and label items in video frames, embodiments of this disclosure provide systems and methods that provide functionality for automatically identifying and labeling objects in images. By providing automatic identification and labeling of objects in images such as video frames of videos, the efficiency of operations within a machine-learning image processing system may be increased. For example, by automatically identifying and labeling objects in images, personnel may be able to quickly and efficiently locate items of interest in videos such as security videos. Other technical advantages will be readily apparent to one skilled in the art from the following figures, descriptions, and claims. Moreover, while specific advantages have been enumerated above, various embodiments may include all, some, or none of the enumerated advantages.

Thus, it will be appreciated that the technological solutions provided herein, and missing from conventional systems, are more than a mere application of a manual process to a computerized environment, but rather include functionality to implement a technical process to replace or supplement current manual solutions or non-existing solutions for automatically identifying and labeling objects in images. In doing so, the present disclosure goes well beyond a mere application the manual process to a computer. Accordingly, the disclosure and/or claims herein necessarily provide a technological solution that overcomes a technological problem.

Furthermore, the functionality for automatically identifying and labeling objects in images provided by the present disclosure represents a specific and particular implementation that results in an improvement in the utilization of a computing system for resource optimization. Thus, rather than a mere improvement that comes about from using a computing system, the present disclosure, in enabling a system to automatically identify and label similar objects in video frames, represents features that result in a computing system device that can be used more efficiently and is improved over current systems that do not implement the functionality described herein. As such, the present disclosure and/or claims are directed to patent eligible subject matter.

In embodiments, the present disclosure includes techniques for training models (e.g., machine-learning models, artificial intelligence models, algorithmic constructs, etc.) for performing or executing a designated task or a series of tasks (e.g., one or more features for automatically identifying and labeling objects in images in accordance with embodiments of the present disclosure). The disclosed techniques provide a systematic approach for the training of such models to enhance performance, accuracy, and efficiency in their respective applications. In embodiments, the techniques for training the models may include collecting a set of data from a database, conditioning the set of data to generate a set of conditioned data, and/or generating a set of training data including the collected set of data and/or the conditioned set of data. In embodiments, that model may undergo a training phase wherein the model may be exposed to the set of training data, such as through an iterative processes of learning in which the model adjusts and optimizes its parameters and algorithms to improve its performance on the designated task or series of tasks. This training phase may configure the model to develop the capability to perform its intended function with a high degree of accuracy and efficiency. In embodiments, the conditioning of the set of data may include modification, transformation, and/or the application of targeted algorithms to prepare the data for training. The conditioning step may be configured to ensure that the set of data is in an optimal state for training the model, resulting in an enhancement of the effectiveness of the model's learning process. These features and techniques not only qualify as patent-eligible features but also introduce substantial improvements to the field of computational modeling. These features are not merely theoretical but represent an integration of a concepts into a practical applications that significantly enhance the functionality, reliability, and efficiency of the models developed through these processes.

In embodiments, the present disclosure includes techniques for generating a notification of an event (e.g., the generation of object images for particular detected objects in images) that includes generating an alert that includes information specifying the location of a source of data associated with the event, formatting the alert into data structured according to an information format; and transmitting the formatted alert over a network to a device associated with a receiver based upon a destination address and a transmission schedule. In embodiments, receiving the alert enables a connection from the device associated with the receiver to the data source over the network when the device is connected to the source to retrieve the data associated with the event and causes a viewer application (e.g., a graphical user interface (GUI)) to be activated to display the data associated with the event. These features represent patent eligible features, as these features amount to significantly more than an abstract idea. These features, when considered as an ordered combination, amount to significantly more than simply organizing and comparing data. The features address the Internet-centric challenge of alerting a receiver with time sensitive information. This is addressed by transmitting the alert over a network to activate the viewer application, which enables the connection of the device of the receiver to the source over the network to retrieve the data associated with the event. These are meaningful limitations that add more than generally linking the use of an abstract idea (e.g., the general concept of organizing and comparing data) to the Internet, because they solve an Internet-centric problem with a solution that is necessarily rooted in computer technology. These features, when taken as an ordered combination, provide unconventional steps that confine the abstract idea to a particular useful application. Therefore, these features represent patent eligible subject matter.

In various embodiments, the system comprises one or more processors interconnected with a memory module, capable of executing machine-readable instructions. These instructions include, but are not limited to, the steps outlined in any flow diagram, system diagram, block diagram, and/or process diagram disclosed herein, as well as steps corresponding to any functionality detailed herein. In embodiments, the execution of these machine-readable instructions may involve initiating multiple concurrent computer processes. Each process of the concurrent computer process may be configured to handle or process a designated subset or portion of the of the machine-readable instructions. This division of tasks enables parallel processing, multi-processing, and/or multi-threading, enabling multiple operations to be conducted or executed concurrently rather than sequentially. This functionality for spawning a plurality of concurrent processes to manage separate portions of the machine-readable instructions markedly increases the overall speed of execution of the machine-readable instructions. By leveraging parallel or concurrent processing, the time required to complete a set or subset of program steps is substantially reduced (e.g., when compared to execution without concurrent or parallel processing). This efficiency gain not only accelerates the processing speed but also optimizes the use of processor resources, leading to an improved performance of the computing system. This enhancement in computational efficiency constitutes a significant technological improvement, as it enhances the functional capabilities of the processors and the system as a whole, representing a practical and tangible technological advancement. The result of this concurrent processing functionality results in an improvement in the functioning of the one or more processor and/or the computing system, and thus, represents a practical application.

In embodiments, one or more operations and/or functionality of components described herein can be distributed across a plurality of computing systems (e.g., personal computers (PCs), user devices, servers, processors, etc.), such as by implementing the operations over a plurality of computing systems. This distribution can be configured to facilitate the optimal load balancing of traffic (e.g., requests, responses, notifications, etc.), which can encompass a wide spectrum of network traffic or data transactions. By leveraging a distributed operational framework, a system implemented in accordance with embodiments of the present disclosure can effectively manage and mitigate potential bottlenecks, ensuring equitable processing distribution and preventing any single device from shouldering an excessive burden. This load balancing approach significantly enhances the overall responsiveness and efficiency of the network, markedly reducing the risk of system overload and ensuring continuous operational uptime. The technical advantages of this distributed load balancing can extend beyond mere efficiency improvements. It introduces a higher degree of fault tolerance within the network, where the failure of a single component does not precipitate a systemic collapse, markedly enhancing system reliability. Additionally, this distributed configuration promotes a dynamic scalability feature, enabling the system to adapt to varying levels of demand without necessitating substantial infrastructural modifications. The integration of advanced algorithmic strategies for traffic distribution and resource allocation can further refine the load balancing process, ensuring that computational resources are utilized with optimal efficiency and that data flow is maintained at an optimal pace, regardless of the volume or complexity of the requests being processed. Moreover, the practical application of these disclosed features represents a significant technical improvement over traditional centralized systems. Through the integration of the disclosed technology into existing networks, entities can achieve a superior level of service quality, with minimized latency, increased throughput, and enhanced data integrity. The distributed approach of embodiments can not only bolster the operational capacity of computing networks but can also offer a robust framework for the development of future technologies, underscoring its value as a foundational advancement in the field of network computing.

To aid in the load balancing, the computing system of embodiments of the present disclosure can spawn multiple processes and threads to process data traffic concurrently. The speed and efficiency of the computing system can be greatly improved by instantiating more than one process or thread to implement the claimed functionality. However, one skilled in the art of programming will appreciate that use of a single process or thread can also be utilized and is within the scope of the present disclosure.

It is an object of the disclosure to provide a system, a method, and a computer-based tool for analyzing video frames from video cameras in order to identify and extract objects from the video frames. It is a further object of the disclosure to provide a system, a method, and a computer-based tool for grouping the identified objects from the video frames into groups based on similarity. It is a further object of the disclosure to provide a system, a method, and a computer-based tool for creating and maintaining an image object index that may be used to identify and extract objects from video frames across multiple locations. These and other objects are provided by the present disclosure, including at least the following embodiments.

In one particular embodiment, a method for identifying and extracting objects from a video frame includes accessing a video frame of a video generated by a camera when viewing a physical environment. The method further includes analyzing the video frame of the video in order to generate a plurality of masks. Each mask includes a set of neighboring pixels that are determined to be related. The method further includes extracting a plurality of objects from the video frame based on the generated plurality of masks. The method further includes recursively extracting a plurality of nested objects from the video frame based on the generated plurality of masks. Each particular nested object is related to a particular one of the plurality of objects. The method further includes creating a plurality of object images by combining the plurality of masks of the plurality of objects with image data of the video frame and combining the plurality of masks of the plurality of nested objects with the image data of the video frame. The method further includes displaying one or more of the plurality of object images in a graphical user interface.

In another particular embodiment, a method for grouping objects from a video frame into groups based on similarity includes accessing a plurality of video frames of a video. The method further includes identifying a plurality of objects from the plurality of video frames. The method further includes generating a plurality of composite vectors for the plurality of objects by: generating a plurality of vectors for each particular object of the plurality of objects extracted from the plurality of video frames; and generating a particular composite vector for each particular object by combining the plurality of vectors for the particular object. The method further includes determining, using the composite vectors for the plurality of objects, a plurality of similar objects. The method further includes displaying images of one or more of the plurality of similar objects in a graphical user interface.

In another particular embodiment, a method for using an index to identify and extract objects from video frames across multiple locations includes accessing a plurality of first video frames of a first video captured at a first physical location. The method further includes identifying a plurality of first objects from the plurality of first video frames. The method further includes generating a plurality of first composite vectors for the plurality of first objects. The method further includes storing the plurality of first composite vectors in an index. The method further includes accessing a plurality of second video frames of a second video captured at a second physical location. The method further includes identifying a plurality of second objects from the plurality of second video frames. The method further includes generating a plurality of second composite vectors for the plurality of second objects. The method further includes determining, using the index and the plurality of second composite vectors for the plurality of second objects, a plurality of similar objects. The method further includes displaying images of one or more of the plurality of similar objects in a graphical user interface.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
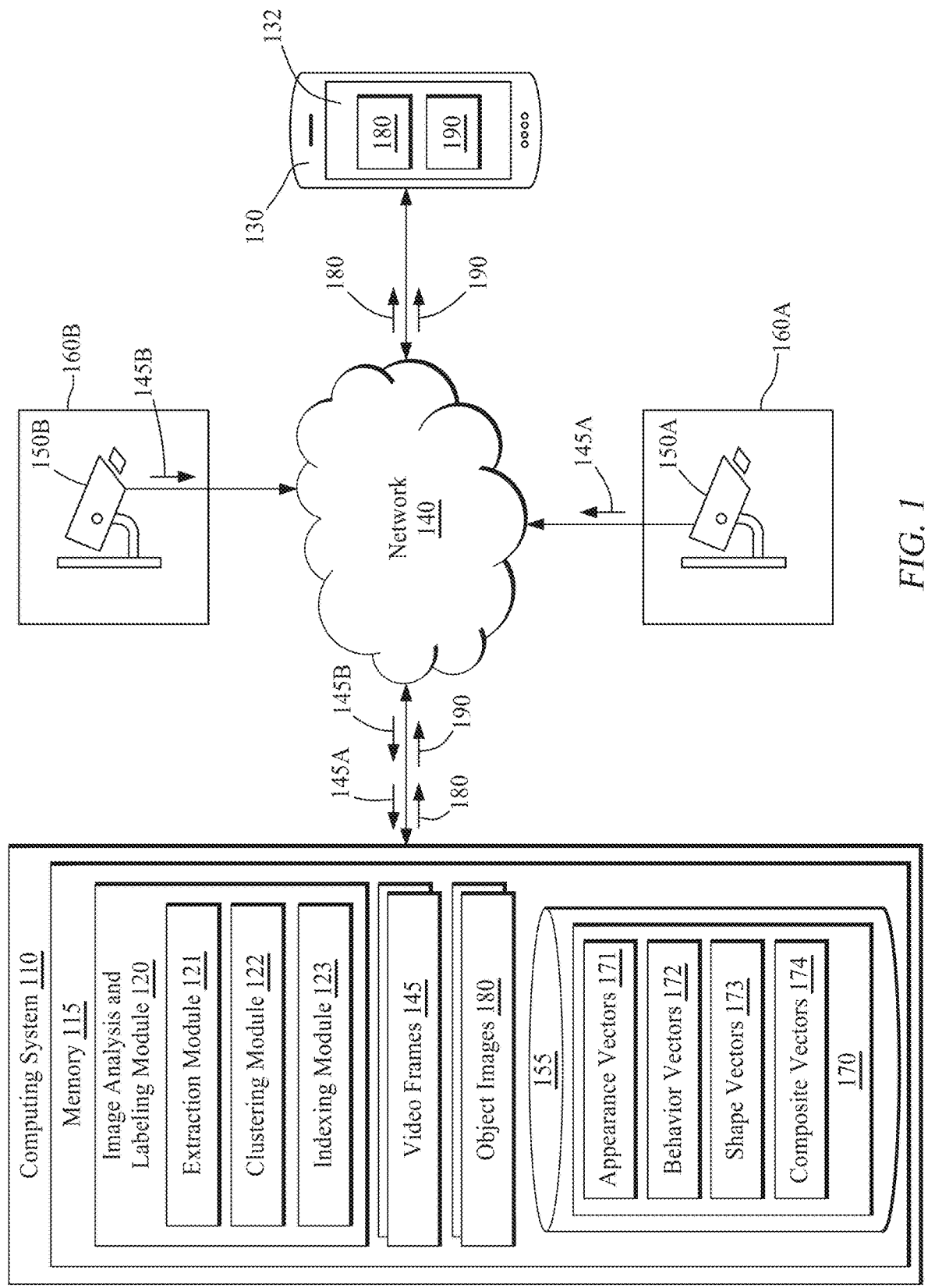
FIG. 1 is a diagram illustrating an image analysis and labeling system, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Object recognition in the field of computer vision involves identifying and labeling objects that are depicted in images and videos. For example, objects in a video captured by a security camera may be manually labeled by a user in order to train a computer vision model. Ideally, images such as the frames of a video can be processed by a system so that all objects within the images may be identified and labeled with 100% accuracy. However, current systems and methods for identifying and labeling objects in images are not always accurate, may be slow, may be performed manually by a person, or may require excessive computer resources.

To address these and other problems with identifying and labeling objects in images and videos, the disclosed embodiments provide systems, methods, and computer-readable media for automatically identifying and labeling objects in images. As a specific example, consider a scenario where a manufacturing facility utilizes multiple security video cameras to monitor a warehouse. The disclosed embodiments automatically analyze the images/videos captured by the cameras in order to identify and label objects within the images/videos (e.g., people, forklifts, boxes, etc.). To do so, the disclosed systems and methods combine multiple imaging and artificial intelligence (AI) systems/techniques to identify the objects in the images and then to isolate and encode properties of each object. The disclosed systems and methods then group and assign labels to each identified object.

In some embodiments, the disclosed systems and methods utilize three modules in order to identify and label objects in images: an extraction module, a clustering module, and an indexing module. The extraction module identifies objects within video frames captured by a video camera that is located within a physical environment. For example, some embodiments of the extraction module generate a plurality of masks from a video frame, extract a plurality of objects from the video frame based on the generated masks, and recursively extract a plurality of nested objects from the video frame based on the generated masks. Images of the identified objects and nested objects may be displayed to the user in a graphical user interface. Once the objects within the video frames have been identified by the extraction module, the clustering module is used to group the identified objects into groups based on similarity. For example, some embodiments of the clustering module generate a plurality of composite vectors for the identified objects. In some embodiments, each composite vector is a linear combination of an appearance vector, a behavior vector, and a shape vector for each identified object. The groups of similar objects identified by the clustering module may be displayed to the user in a graphical user interface. The indexing module may store the vectors generated for each identified object an index that may be used to identify objects in future videos. For example, once the index has been created, identified objects from new videos (e.g., from different physical locations) may be compared to the index in order to quickly and accurately identify and label objects in the new videos. As a result, objects depicted in images such as video frames of a video may be quickly and accurately identified and labeled without requiring a user to manually identify the objects.

Figure 2:
FIG. 2 illustrates a video frames that may be analyzed and labeled by the image analysis and labeling system of FIG. 1, according to particular embodiments.
Figure 3:
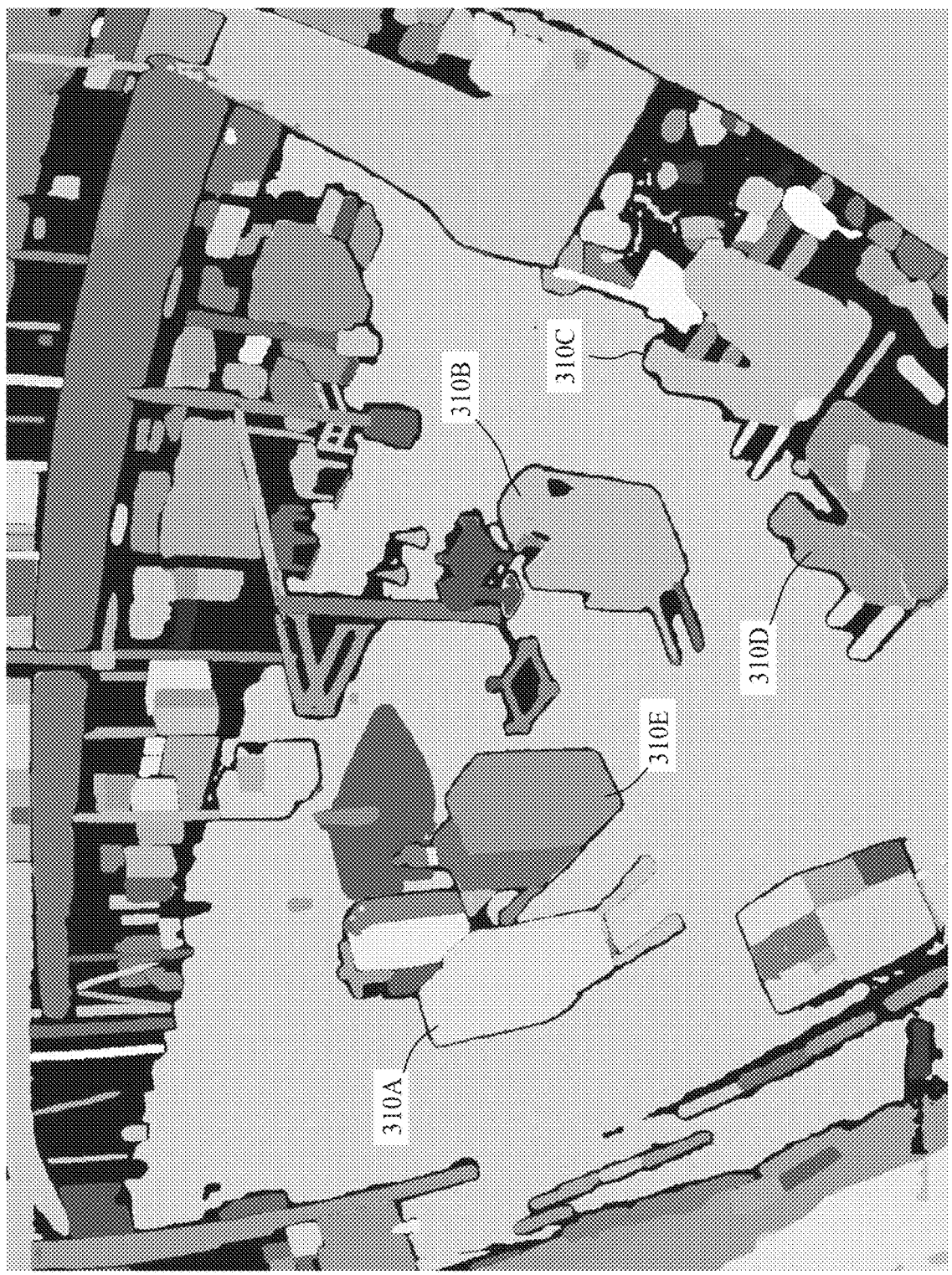
FIG. 3 illustrates masks that may be generated by the image analysis and labeling system of FIG. 1, according to particular embodiments.
Figure 4C:
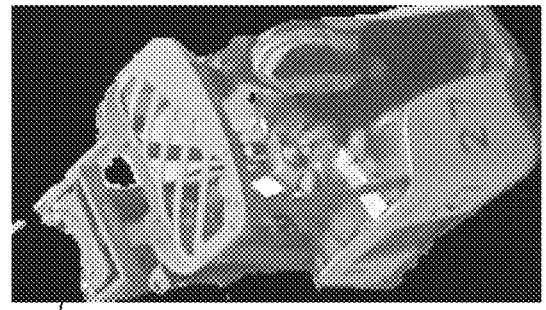
FIGS. 4A-4E illustrate object images that may be generated and displayed by the image analysis and labeling system of FIG. 1, according to particular embodiments.
Figure 4B:
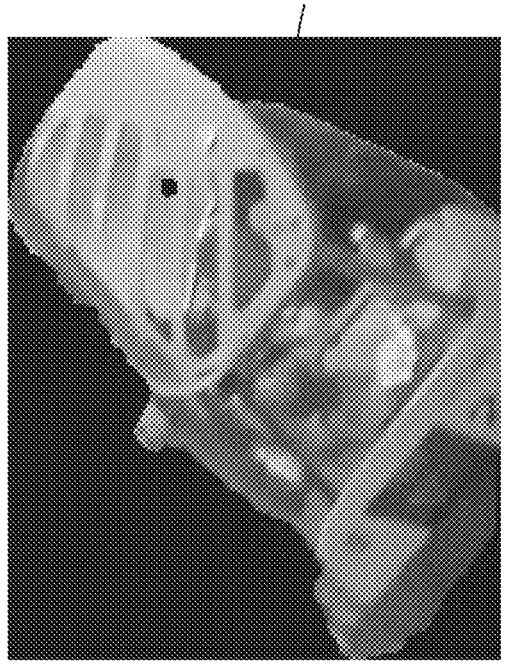
Figure 4A:
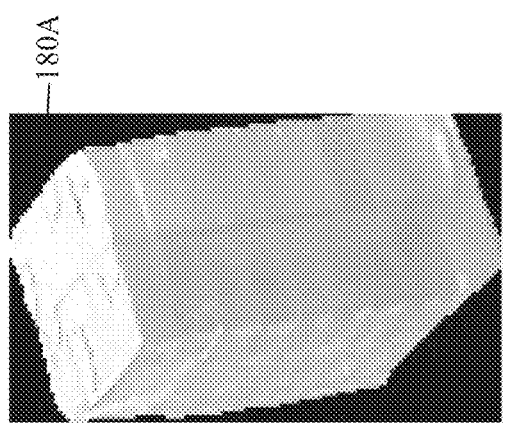
Figure 4D:
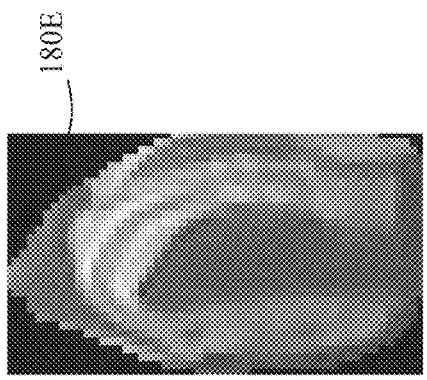
Figure 4E:
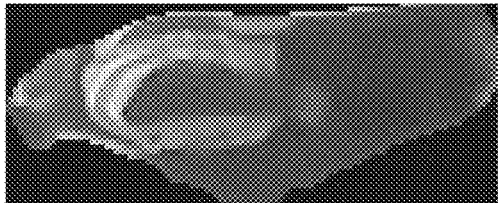
Figure 5:
FIGS. 5 and 6 illustrate bounding boxes that may be generated and displayed by the image analysis and labeling system of FIG. 1, according to particular embodiments.
Figure 6:
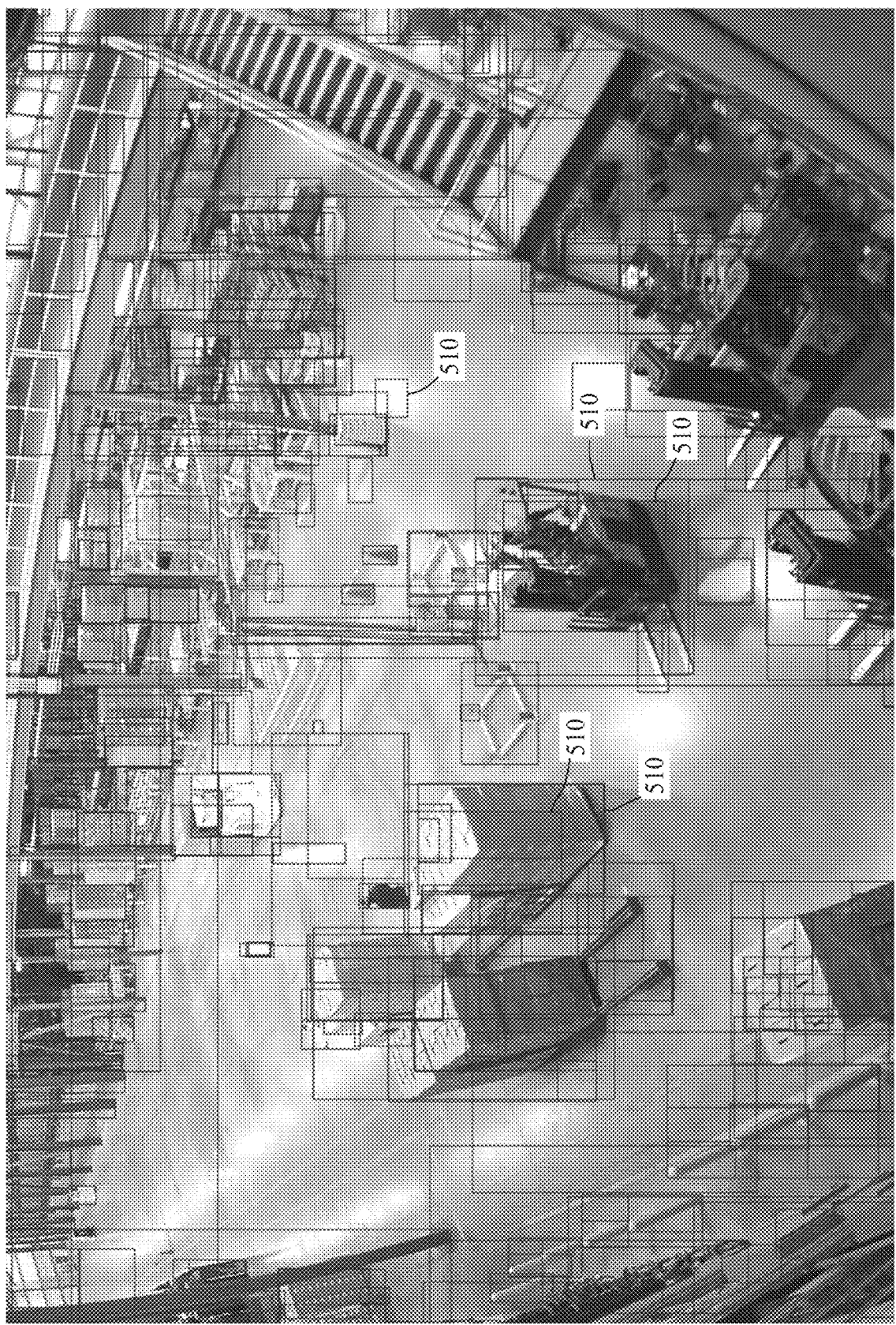
Figure 7:
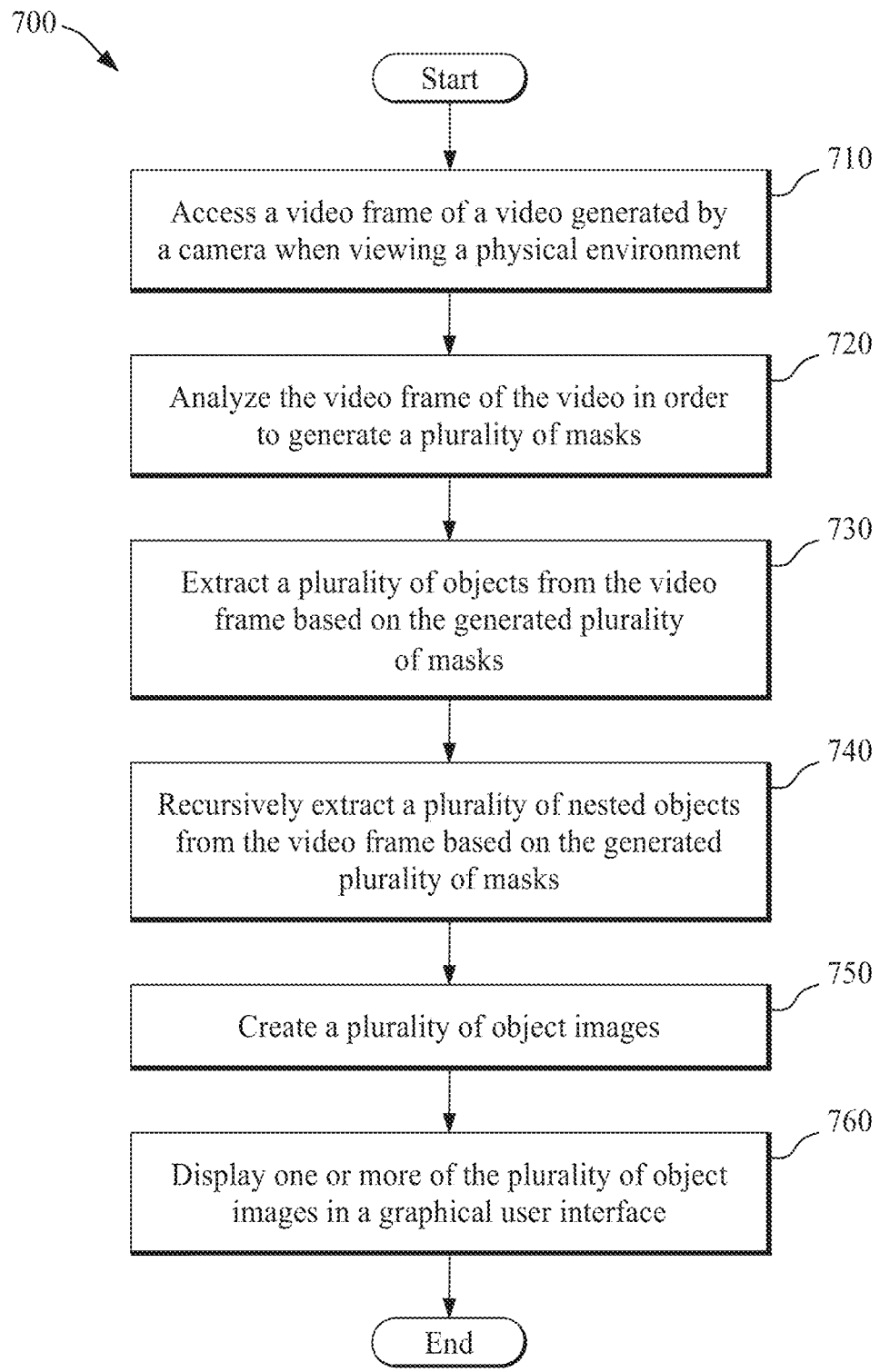
FIG. 7 is a chart illustrating a method for identifying and extracting objects from video frames, according to particular embodiments.
Figure 8:
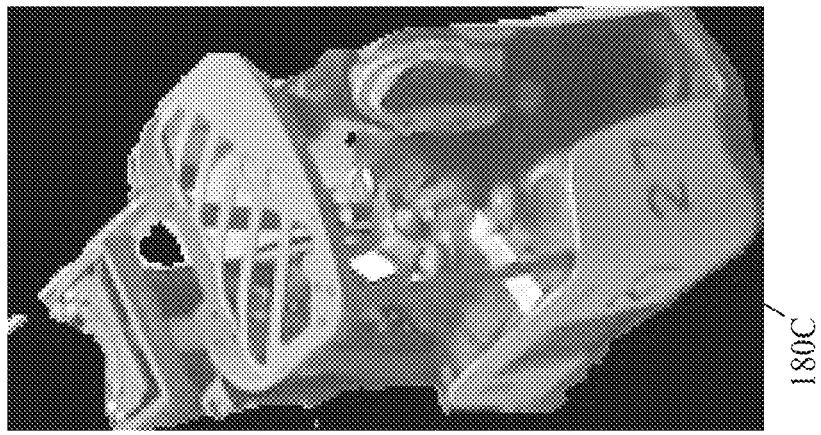
FIG. 8 illustrates a group of similar objects and a user-editable label that may be displayed by the image analysis and labeling system of FIG. 1, according to particular embodiments.
Figure 8:
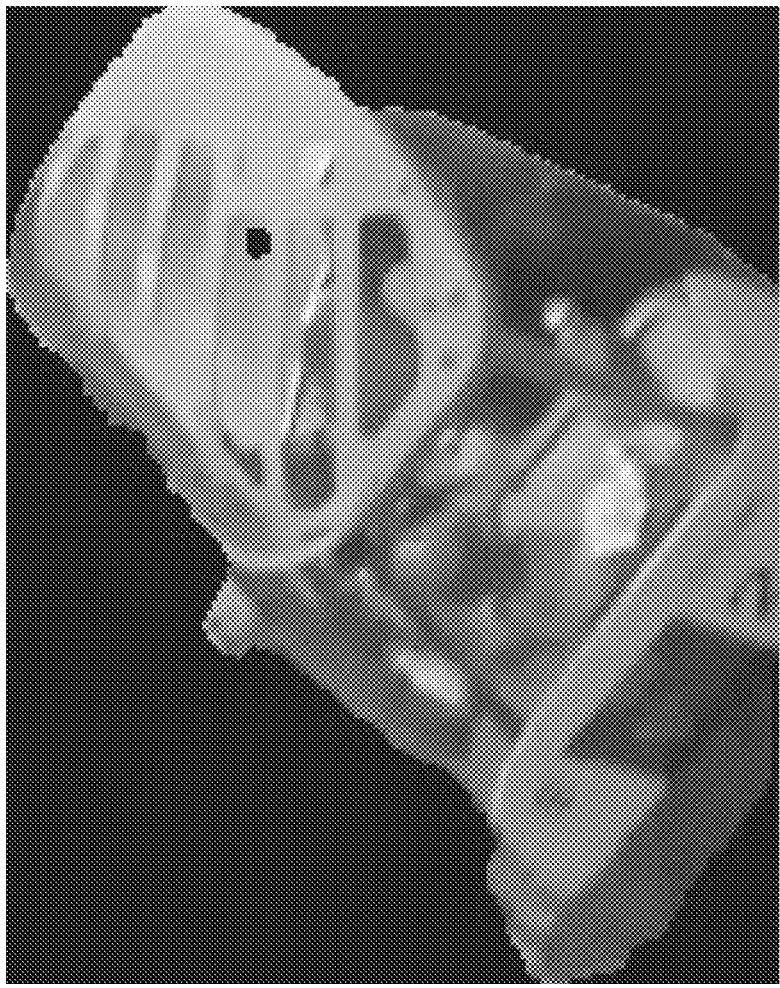
Figure 9:
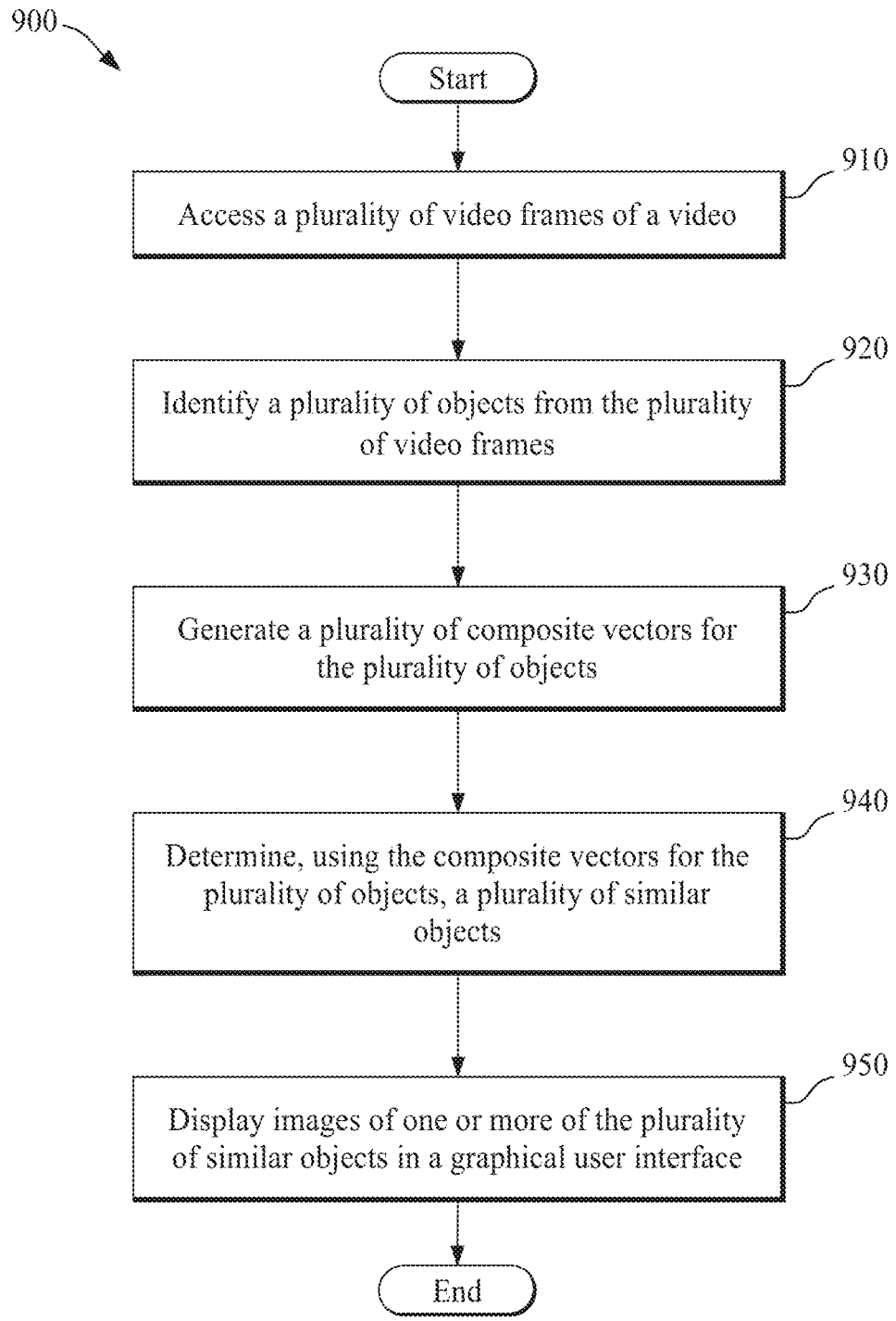
FIG. 9 is a chart illustrating a method for grouping objects based on similarity, according to particular embodiments.
Figure 10:
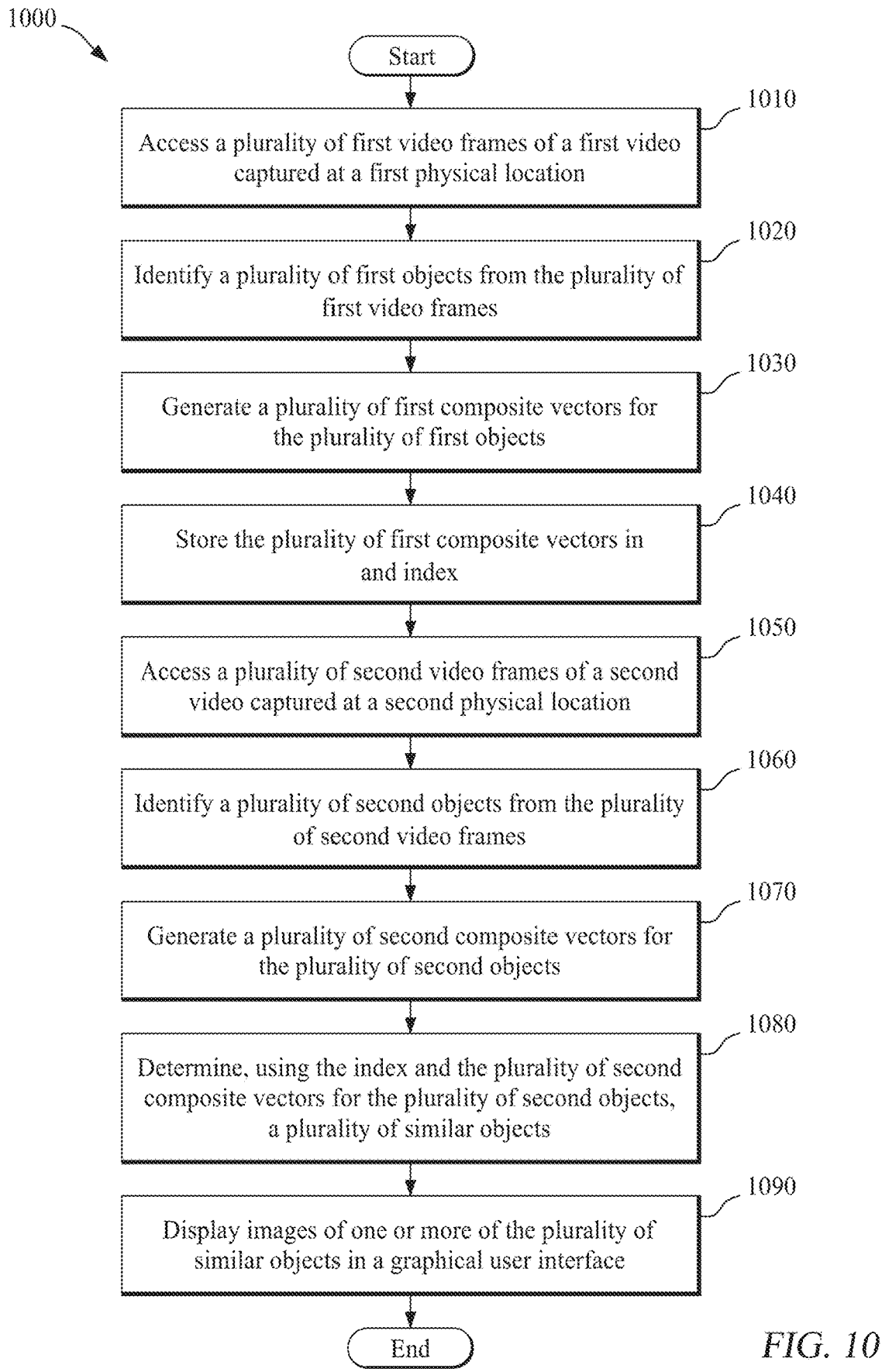
FIG. 10 is a chart illustrating a method for utilizing an index to identify and label objects from video frames across multiple locations, according to particular embodiments.
Figure 11:
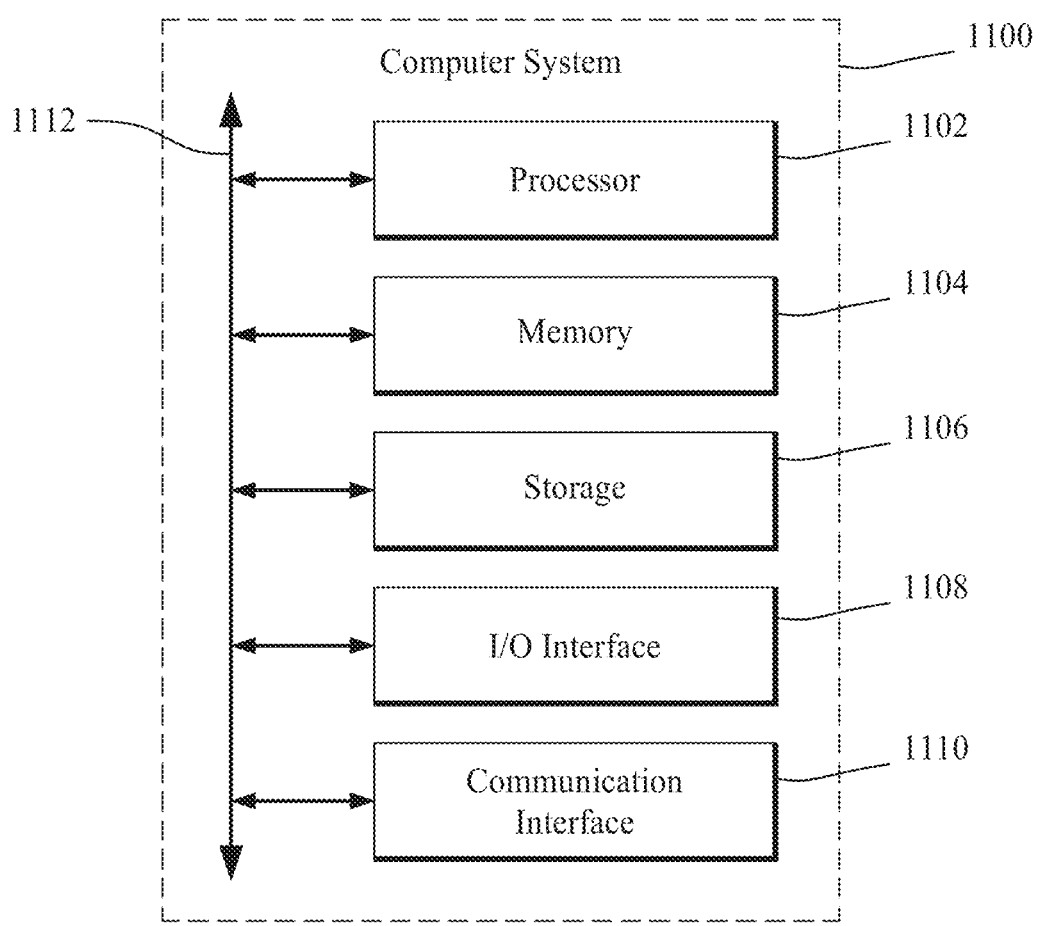
FIG. 11 is an example computer system that can be utilized to implement aspects of the various technologies presented herein, according to particular embodiments.

The disclosed embodiments will now be described in reference to FIGS. 1-11. FIG. 1 is a diagram illustrating an image analysis and labeling system, according to particular embodiments. FIG. 2 illustrates a video frames that may be analyzed and labeled by the image analysis and labeling system of FIG. 1, according to particular embodiments. FIG. 3 illustrates masks that may be generated by the image analysis and labeling system of FIG. 1, according to particular embodiments. FIGS. 4A-4E illustrate object images that may be generated and displayed by the image analysis and labeling system of FIG. 1, according to particular embodiments. FIGS. 5 and 6 illustrate bounding boxes that may be generated and displayed by the image analysis and labeling system of FIG. 1, according to particular embodiments. FIG. 7 is a chart illustrating a method for identifying and extracting objects from video frames, according to particular embodiments. FIG. 8 illustrates a group of similar objects and a user-editable label that may be displayed by the image analysis and labeling system of FIG. 1, according to particular embodiments. FIG. 9 is a chart illustrating a method for grouping objects based on similarity, according to particular embodiments. FIG. 10 is a chart illustrating a method for utilizing an index to identify and label objects from video frames across multiple locations, according to particular embodiments. FIG. 11 is an example computer system that can be utilized to implement aspects of the various technologies presented herein, according to particular embodiments.

FIG. 1 is a diagram illustrating an image analysis and labeling system 100, according to particular embodiments. Image analysis and labeling system 100 includes a computing system 110, a client system 130, a network 140, and one or more video cameras 150 (e.g., video camera 150A and video camera 150B). Computing system 110, client system 130, network 140, and video cameras 150 are communicatively coupled together using any appropriate wired or wireless communication system or network (e.g., network 140). In some embodiments, each video camera 150 is located within a physical environment 160. While FIG. 1 illustrates a certain number and arrangement of computing system 110, client system 130, and video cameras 150, other embodiments may have any other appropriate arrangement and number of these components.

In general, image analysis and labeling system 100 analyzes video frames 145 captured by one or more video cameras 150 that are located within physical environments 160 in order to automatically identify and label objects within video frames 145. To do so, some embodiments of image analysis and labeling system 100 first utilize extraction module 121 to identify and extract objects from video frames 145. For example, some embodiments of extraction module 121 generate a plurality of masks (e.g., masks 310 illustrated in FIG. 3) that include neighboring pixels within video frames 145 that are determined to be related. Using the generated masks, extraction module 121 may then extract a plurality of objects from video frames 145. In some embodiments, extraction module 121 may also recursively extract a plurality of nested objects from video frames 145 based on the generated masks. Image analysis and labeling system 100 may generate object images 180 of the identified objects and nested objects and may display the object images 180 to a user in a graphical user interface on client system 130. Each object image 180 may include a cropped image of a corresponding object or nested object from video frames 145 that is placed on a solid-color background as illustrated in FIGS. 4A-4E.

Once the objects within video frames 145 have been identified by extraction module 121, some embodiments of image analysis and labeling system 100 utilize clustering module 122 to group the identified objects into groups based on similarity. For example, some embodiments of clustering module 122 generate a plurality of object vectors 170 for each identified object. In some embodiments, object vectors 170 include appearance vectors 171, behavior vectors 172, shape vectors 173, and composite vectors 174. Each composite vector 174 may be a linear combination of an appearance vector 171, a behavior vector 172, and a shape vector 173 for each particular identified object within video frames 145. The groups of similar objects identified by clustering module 122 may be displayed to the user in a graphical user interface on client system 130. In some embodiments, image analysis and labeling system 100 includes a label (e.g., user-editable label 810 as illustrated in FIG. 8) for each group of similar objects that the user may edit.

In some embodiments, image analysis and labeling system 100 includes an indexing module 123 that stores object vectors 170 in an image object index 155 that may be used to identify objects in future videos. For example, once image object index 155 has been created using video frames 145A captured by video camera 150A at a first physical environment 160A, identified objects from new video frames 145B captured by video camera 150B at a second physical environment 160B may be compared to image object index 155 in order to quickly and accurately identify and label objects in the new video frames 145B. This may allow the user to perform a query such as "show me all forklifts at physical environment 160B" without requiring a user to manually identify objects within video frames 145B in order to train image analysis and labeling system 100 on the new video frames 145. As a result, objects depicted in images such as video frames of a video may be quickly and accurately identified and labeled without requiring a user to manually identify the objects.

Computing system 110 may be any appropriate computing system in any suitable physical form. As example and not by way of limitation, computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computing system 110 may include one or more computer systems; be unitary or distributed; span multiple locations; span multiple machines; span multiple data centers; or reside in a cloud, which may include one or more cloud components in one or more networks. Where appropriate, computing system 110 may perform without substantial spatial or temporal limitation one or more steps of one or more methods described or illustrated herein. As an example, and not by way of limitation, computing system 110 may perform in real time or in batch mode one or more steps of one or more methods described or illustrated herein. Computing system 110 may perform at different times or at different locations one or more steps of one or more methods described or illustrated herein, where appropriate. A particular example of a computing system 110 is described in reference to FIG. 11.

Computing system 110 includes one or more memory units/devices 115 (collectively herein, "memory 115") that may store image analysis and labeling module 120, video frames 145, object images 180, and image object index 155. Image analysis and labeling module 120 may be a software module/application utilized by computing system 110 to analyze video frames 145 from video cameras 150 in order to determine and label objects within video frames 145, as described herein. Image analysis and labeling module 120 represents any suitable set of instructions, logic, or code embodied in a computer-readable storage medium. For example, image analysis and labeling module 120 may be embodied in memory 115, a disk, a CD, or a flash drive. In particular embodiments, image analysis and labeling module 120 may include instructions (e.g., a software application) executable by a computer processor to perform some or all of the functions described herein.

Client system 130 is any appropriate user device for communicating with components of image analysis and labeling system 100 over network 140 (e.g., the internet). In particular embodiments, client system 130 may be an electronic device including hardware, software, or embedded logic components or a combination of two or more such components and capable of carrying out the appropriate functionalities implemented or supported by client system 130. As an example, and not by way of limitation, a client system 130 may include a computer system (e.g., computer system 1100) such as a desktop computer, notebook or laptop computer, netbook, a tablet computer, e-book reader, GPS device, camera, personal digital assistant (PDA), handheld electronic device, cellular telephone, smartphone, smartwatch, augmented/virtual reality device such as wearable computer glasses, other suitable electronic device, or any suitable combination thereof. This disclosure contemplates any suitable client system 130. A client system 130 may enable a network user at client system 130 to access network 140. A client system 130 may enable a user to communicate with other users at other client systems 130. Client system 130 may include an electronic display that displays graphical user interface 132, a processor such processor 1102, and memory such as memory 1104.

Network 140 allows communication between and amongst the various components of image analysis and labeling system 100. This disclosure contemplates network 140 being any suitable network operable to facilitate communication between the components of image analysis and labeling system 100. Network 140 may include any interconnecting system capable of transmitting audio, video, signals, data, messages, or any combination of the preceding. Network 140 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network.

Video camera 150 is any appropriate video or image sensor that is capable of capturing images or video such as video frames 145. In some embodiments, video camera 150 is a security camera. In some embodiments, each video camera 150 is physically located in a particular physical environment 160. In some embodiments, video camera 150 electronically transmits video frames 145 (e.g., either wired or wirelessly) to computing system 110 (e.g., via network 140). Video frames 145 are individual images of a video. An example of a video frame 145 is illustrated in FIG. 2.

Physical environment 160 is any physical real-world space. Examples of physical environment 160 may be a manufacturing facility, a residence, a retail establishment, a professional building, a medical building such as a hospital, an airport, a port, a construction facility, a refinery, a utility station such as an electrical transfer station, and the like. While particular examples of physical environment 160 have been described herein, it should be understood that physical environment 160 may be, without limitation, any indoor or outdoor physical environment, space, or location.

Object vectors 170 are vectors that are generated by image analysis and labeling system 100 when analyzing video frames 145. In some embodiments, object vectors 170 are generated by image analysis and labeling module 120 (e.g., by either extraction module 121 or clustering module 122 of image analysis and labeling module 120). In some embodiments, object vectors 170 include appearance vectors 171, behavior vectors 172, shape vectors 173, and composite vectors 174. In some embodiments, each composite vector 174 corresponds to a particular identified object within video frames 145 and is a combination (e.g., a linear combination) of an appearance vector 171, a behavior vector 172, and a shape vector 173 for the particular identified object. Appearance vectors 171, behavior vectors 172, shape vectors 173, and composite vectors 174 are discussed in more detail below.

Object images 180 are images generated by image analysis and labeling module 120 of objects identified from video frames 145. In some embodiments, each object image 180 is a cropped image of a corresponding object or nested object identified from video frames 145 by extraction module 121. In some embodiments, the cropped images of the objects or nested objects are formed using masks generated by extraction module 121 (e.g., masks 310). In these embodiments, the original image data may be cropped using the masks in order to generate the cropped images of the objects or nested objects. In some embodiments, the cropped images of the objects or nested objects are placed on a solid-color background (e.g., black). Examples of object images 180 are illustrated in FIGS. 4A-4E.

Notification 190 is any appropriate alert or message that is sent to another device (e.g., client system 130) by computing system 110 when it is determined that an event needs to be reported. In some embodiments, notification 190 includes an indication that object images 180 are available. In some embodiments, notification 190 includes one or more object images 180. In some embodiments, notification 190 is displayed on client system 130. As a specific example, notification 190 may be an email message or text message that is sent to a user that object images 180 are available for viewing.

In operation, image analysis and labeling system 100 as illustrated in FIG. 1 accesses and analyzes video frames 145 captured by one or more video cameras 150 that are located within physical environments 160 in order to automatically identify and label objects within video frames 145. Instead of the typical manual method of a user hand-drawing boxes around objects within each frame of video frames 145 in order to train a system (e.g., a machine-learning system), image analysis and labeling system 100 automatically extracts and identifies objects (including nested objects) within video frames 145, thereby providing considerable savings of time and computer resources. To accomplish this, some embodiments of image analysis and labeling system 100 first utilize extraction module 121 to identify and extract objects from video frames 145. For example, some embodiments of extraction module 121 generate a plurality of masks (e.g., masks 310 illustrated in FIG. 3) that include neighboring pixels within video frames 145 that are determined to be related. Using the generated masks, extraction module 121 may then extract a plurality of objects from video frames 145. In some embodiments, extraction module 121 may also recursively extract a plurality of nested objects from video frames 145 based on the generated masks. Image analysis and labeling system 100 may generate object images 180 of the identified objects and nested objects and may display the object images 180 to a user in a graphical user interface on client system 130. Each object image 180 may include a cropped image of a corresponding object or nested object from video frames 145 that is placed on a solid-color background as illustrated in FIGS. 4A-4E. Extraction module 121 is described in more detail below.

Once the objects within video frames 145 have been identified by extraction module 121, some embodiments of image analysis and labeling system 100 utilize clustering module 122 to group the identified objects into groups based on similarity. For example, some embodiments of clustering module 122 generate a plurality of object vectors 170 for each identified object. In some embodiments, object vectors 170 include appearance vectors 171, behavior vectors 172, shape vectors 173, and composite vectors 174. Each composite vector 174 may be a linear combination of an appearance vector 171, a behavior vector 172, and a shape vector 173 for each particular identified object within video frames 145. The groups of similar objects identified by clustering module 122 may be displayed to the user in a graphical user interface on client system 130. In some embodiments, image analysis and labeling system 100 includes a label (e.g., user-editable label 810 as illustrated in FIG. 8) for each group of similar objects that the user may edit. Clustering module 122 is described in more detail below.

In some embodiments, image analysis and labeling system 100 includes an indexing module 123 that stores object vectors 170 in an image object index 155 that may be used to identify objects in future videos. For example, once image object index 155 has been created using video frames 145A captured by video camera 150A at a first physical environment 160A, identified objects from new video frames 145B captured by video camera 150B at a second physical environment 160B may be compared to image object index 155 in order to quickly and accurately identify and label objects in the new video frames 145B. This may allow the user to perform a query such as "show me all forklifts at physical environment 160B" without requiring a user to manually identify objects within video frames 145B (i.e., in order to train image analysis and labeling system 100 on the new video frames 145). As a result, objects depicted in images such as video frames 145 may be quickly and accurately identified and labeled without requiring a user to manually identify the objects (e.g., by drawing boxes around the objects). Indexing module 123 is described in more detail below.

Extraction module 121 may be a software module/application utilized by computing system 110 to analyze video frames 145 from video cameras 150 in order to identify and extract objects from video frames 145, as described herein. Extraction module 121 represents any suitable set of instructions, logic, or code embodied in a computer-readable storage medium. For example, extraction module 121 may be embodied in memory 115, a disk, a CD, or a flash drive. In particular embodiments, extraction module 121 may include instructions (e.g., a software application) executable by a computer processor to perform some or all of the functions described herein.

In general, extraction module 121 identifies and extracts objects from video frames 145. As a first step, some embodiments of extraction module 121 access a video frame 145 of a video generated by video camera 150 when viewing physical environment 160. An example of a video frame 145 is illustrated in FIG. 2. In this particular example, video camera 150 is within a physical environment 160 that is a warehouse. In some embodiments, video frames 145 are stored in memory 115 of computing system 110.

Next, extraction module 121 may analyze the video frame 145 of the video in order to generate a plurality of masks 310 as illustrated in FIG. 3. In some embodiments, each mask 310 includes a set of neighboring pixels that are determined to be related (e.g., by color). In some embodiments, any appropriate segmentation algorithm may be used to generate masks 310. For example, some embodiments utilize SEGMENT ANYTHING MODEL (SAM) from META in order to extract all the objects in the video frame 145 in the form of masks 310 (i.e., a binary bitmap image that shows the separation of where objects start and stop in a frame) for each object. SAM has modifiable settings such that the number of masks 310 being detected in each video frame 145 can be changed as well as settings which reduce the number of overlapping object masks.

In some embodiments, extraction module 121 utilizes a two-step process to create masks 310. In some embodiments, the first step is image encoding where the image is turned into a set of features. The second step is mask generation decoding where the image encoded features are turned into masks 310. For example, for every pixel in a video frame 145, extraction module 121 may create a feature vector that represents a mask or information regarding the mask in that area. When that feature vector is passed to a decoder, the decoder turns that feature vector into an actual mask 310. A mask 310 may be defined as a set of neighboring pixels in an image that are considered related. For example, the pixels may be related because they are of the same object, but it may be defined as anything. After creating masks 310, extraction module 121 has a set of masks 310 which have no internal logic between them (e.g., masks and sub-masks). Logic is then applied as described below in order to build relationships between masks 310.

Once extraction module 121 generates masks 310, some embodiments of extraction module 121 may extract a plurality of objects from video frame 145 based on the generated masks 310. In general, extraction module 121 does not have prior knowledge of what unique objects to look for (e.g., forklifts, cars, people, etc.), and does not know how many video frames 145 exist (e.g., a single frame or an hour of footage). Extraction module 121 is unique and novel in that it may extract objects of any type without any prior knowledge of the objects and may operate on any number of video frames 145. In some embodiments, extraction module 121 looks for objects based on the separation resulting from segment generation. In these embodiments, the extracted objects are the masks 310 that are generated by extraction module. In some embodiments, every mask 310 generated by extraction module 121 is identified as an object or a nested object (i.e., all masks 310 generated by extraction module 121 are converted into objects). In other embodiments, all masks 310 generated by extraction module 121 are initially converted into objects but then filtered for further processing to conserve computing resources. For example, if a building or street sign is an object in the background of a scene within video frame 145, it is unlikely that the object will be needed in the downstream application. Unwanted objects (e.g., background objects) may be filtered and discarded using any appropriate technique or threshold. For example, vectorization of the object (as described herein in reference to object vectors 170) can be performed and utilized to determine background/unwanted objects. In these embodiments, vectors 170 (e.g., appearance vectors 171, behavior vectors 172, and shape vectors 173) are computed for each object and then evaluated to determine whether the object is a background object. If the object can be confidently identified (e.g., by using image object index 155) based on the vectorization and the object is deemed to be a background object, the object may be filtered from further processing.

Similarly, some embodiments of extraction module 121 may recursively extract a plurality of nested objects from video frames 145 based on the generated masks 310. Each particular nested object is related to a particular one of the plurality of objects. For example, a particular object within video frames 145 that is identified by extraction module 121 may be a forklift, and a nested object may be a person driving the forklift. As another example, a particular object within video frames 145 that is identified by extraction module 121 may be a person, and a nested object may be a vest worn by the person. To extract the nested objects from video frame 145 based on the generated masks 310, some embodiments of extraction module 121 look for objects based on the separation resulting from segment generation as described above. The general concept here is that shapes have sub-shapes, the sub-shapes may have sub-shapes, and so forth. Extraction module 121 may be configured to recursively navigate the objects in a particular video frame 145 to identify all nested objects. As a specific example, extraction module 121 may generate a top-level mask 310 of a forklift. At the same time at a given point, a mask 310 of a person driving the forklift may be generated, and a mask 310 of the person's vest may also be generated completely independently. The generated masks 310 have no awareness or understanding of each other. The relationships are embedded in the data and may be extracted by a level definition function.

In some embodiments, when a segment is generated (e.g., by SAM), two values may be associated with the segment. First, the segment may have the associated mask 310 which is a binary image that provides the shape of the object. Second, the segment may have a bounding box 510 as illustrated in FIG. 5. Each bounding box 510 may be a box (e.g., a closest fit box) drawn around where the associated shape is located in the particular video frame 145.

In some embodiments, extraction module 121 may generate masks 310 at different levels. In general, the levels define if an object exists inside another object. For example, a mask 310 of a person would have a higher level than a mask 310 of a vest worn by the same person. In some embodiments, masks 310 may have a level of 0, 1, 2, and so forth. To determine the level of a mask 310, some embodiments of extraction module 121 perform an intersection calculation. For example, if there are two masks 310, and if 90% of a first mask 310A exists within a second mask 310B and mask 310B does not exist anywhere within mask 310A, extraction module 121 may determine that mask 310A lives inside mask 310B. In this scenario, extraction module 121 determines that mask 310B must be one level higher than mask 310A. In some embodiments, any mask 310 that is found to not exist within any other mask 310 is found to be a level 0 mask because it does not exist anywhere inside another mask (i.e., the mask 310 is found to be a top-level mask). If a mask 310 exists inside a level 0 mask 310, it is determined to be a level 1 mask 310 because it exists inside one mask 310. If a mask 310 exists inside a level 1 mask 310, it is determined to be a level 2 mask 310 (and so on).

Once the masks 310 of the objects within video frames 145 are used to identify the objects in the frame and the levels of the masks 310 have been defined, the identified objects can be filtered by their associated levels. This is illustrated in FIGS. 5-6. For example, if a user desires to only view top levels (e.g., level 0 objects), all extracted objects having a level of 0 can then be filtered out and only those objects may be considered going forward (e.g., only people rather than the uniform the people are wearing). FIG. 5 illustrates how image analysis and labeling system 100 may display bounding boxes 510 for only level 0 objects. However, if a user desires to view more levels than the top-level objects (e.g., levels 0-3), all extracted objects having a level of 0, 1, 2, or 3 can then be filtered out and only those objects may be considered going forward. FIG. 6 illustrates how image analysis and labeling system 100 may display bounding boxes 510 for level 0-3 objects.

In some embodiments, extraction module 121 creates object images 180 after creating masks 310 and extracting objects from video frames 145. Particular examples of object images 180 are illustrated in FIGS. 4A-4E. In general, each object image 180 is a cropped image of a corresponding object or nested object identified from video frames 145 by extraction module 121, as described above. In some embodiments, the cropped images of the objects or nested objects are formed by combining masks 310 generated by extraction module 121 with image data of video frame 145. In these embodiments, the original image data may be cropped using masks 310 in order to generate the cropped images of the objects or nested objects. In some embodiments, the cropped images of the objects or nested objects are displayed in a graphical user interface (e.g., on client system 130) on a solid-color background (e.g., black). In some embodiments, displaying object images 180 images in the graphical user interface is based on a user input (e.g., user input indicating a mask level of the plurality of object images).

FIG. 7 is a chart illustrating a method 700 for identifying and extracting objects from video frames, according to particular embodiments. In some embodiments, method 700 may be performed by image analysis and labeling module 120 of image analysis and labeling system 100 (e.g., by extraction module 121 of image analysis and labeling module 120). At step 710, method 700 accesses a video frame of a video generated by a camera when viewing a physical environment. In some embodiments, the video frame is video frame 145. In some embodiments, the camera is video camera 150 located within physical environment 160.

At step 720, method 700 analyzes the video frame of the video in order to generate a plurality of masks. In some embodiments, the masks that are generated in step 720 are masks 310. In some embodiments, each mask is a binary bitmap image and includes neighboring pixels that are determined to be related. In some embodiments, analyzing the video frame of the video in order to generate the plurality of masks includes utilizing an image segmentation algorithm such as SAM. In some embodiments, each mask includes an associated level that defines whether the object exists inside another object.

At step 730, method 700 extracts a plurality of objects from the video frame based on the generated masks of step 720. In some embodiments, step 730 includes identifying objects based on the separation resulting from segment generation. In some embodiments, each extracted object is a particular mask 310 generated in step 720.

At step 740, method 700 recursively extracts a plurality of nested objects from the video frame based on the generated plurality of masks. In some embodiments, each particular nested object is related to a particular one of the plurality of objects. In some embodiments, a nested object is a mask that exists within another mask.

At step 750, method 700 creates a plurality of object images. In some embodiments, the object images are object images 180. In some embodiments, each of the plurality of object images includes a cropped image of a corresponding object or nested object on a solid-color background. In some embodiments, the object images are formed by combining the masks (e.g., masks 310) generated in step 7220 with image data of the video frame.

At step 760, method 700 displays one or more of the plurality of object images in a graphical user interface. In some embodiments, the graphical user interface is displayed on a client system such as client system 130. In some embodiments, displaying the one or more of the plurality of object images in the graphical user interface is based on a user input. In some embodiments, the user input indicates a mask level of the plurality of object images. After step 760, method 700 may end.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method including the particular steps of the method of FIG. 7, this disclosure contemplates any suitable method including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Clustering module 122 may be a software module/application utilized by computing system 110 to analyze video frames 145 from video cameras 150 in order to group the identified objects from video frames 145 into groups based on similarity, as described herein. Clustering module 122 represents any suitable set of instructions, logic, or code embodied in a computer-readable storage medium. For example, clustering module 122 may be embodied in memory 115, a disk, a CD, or a flash drive. In particular embodiments, clustering module 122 may include instructions (e.g., a software application) executable by a computer processor to perform some or all of the functions described herein.

In general, clustering module 122 groups the identified objects from video frames 145 into groups based on similarity. In some embodiments, objects may be similar if they have similar properties such as visual appearance, shape/size, or behavior (e.g., movement). For example, as illustrated in FIGS. 4A-4E, image analysis and labeling system 100 (e.g., via extraction module 121) may identify a pallet as depicted in object image 180A of FIG. 4A, a forklift as depicted in object image 180B of FIG. 4B, an additional forklift as depicted in object image 180C of FIG. 4C, a person as depicted in object image 180D of FIG. 4D, and a person's vest as depicted in object image 180E of FIG. 4E. Clustering module 122 may analyze these objects identified by extraction module 121 and determine that the forklifts as depicted in object images 180B and 180C are similar and therefore group these objects together. The group of objects that are determined to be similar by clustering module 122 may then be displayed to the user in a graphical user interface (e.g., on client system 130). For example, object images 180B and 180C may be displayed together as illustrated in FIG. 8. In some embodiments, a user-editable label 810 may be displayed along with the object images 180 of objects that are determined by clustering module 122 to be similar. In some embodiments, user-editable label 810 may be initially populated by image analysis and labeling system 100 using any appropriate identification that may be later edited by a user.

To group the identified objects from video frames 145 into groups based on similarity, some embodiments of clustering module 122 first generate one or more object vectors 170 for each object identified by extraction module 121. In some embodiments, object vectors 170 include appearance vectors 171, behavior vectors 172, shape vectors 173, and composite vectors 174. Appearance vectors 171, behavior vectors 172, shape vectors 173, and composite vectors 174 are described in more detail below.

An appearance vector 171 for a particular object within video frames 145, in general, is a mathematical representation of the appearance of the particular object in multi-dimensional vector space. Each element in appearance vector 171 contains a value that represents a specific aspect or feature of the object being embedded. For example, the aspect or feature of the object could be any arbitrary piece of information that relates to appearance (e.g., the clothing someone is wearing, the color of a car, etc.). As another example, the aspect or feature could be the internal shapes of an object (e.g., the wheels of a car, the prongs of a forklift, etc.).

In some embodiments, appearance vector 171 is generated using masks 310. For example, video frame 145 may be cropped using masks 310, and the crops may be processed by a model (e.g., a pretrained Convolutional Neural Network (CNN)). In some embodiments, appearance vector 171 is extracted by taking the values of one of the last layers of the CNN network before the classification layer. The output is a vector of floating numbers that can be any length based on the model that was used. In some embodiments, any appropriate model such as EfficientNetV2B0, ResNet, etc. may be used to generate appearance vectors 171. In some embodiments, clustering module 122 uses a hierarchical clustering algorithm (e.g., k-means clustering) to take a set of vectors and separate the vectors into groups of vectors that are similar.

In some embodiments, appearance vector 171 can take different forms. In some embodiments, the size of appearance vector 171 is based on the complexing of the scene and objects within video frame 145. For example, the more complex the scene and objects within video frame 145, the larger the appearance vector 171 needs to be in order to capture the amount of information conveyed. In general, an object is more complex with the amount of detail available in the object. Similarly, a scene is also more complex with the amount of detail in the scene. For example, a person in a blue jumpsuit would be less complex as most of the color of the person would be uniform and there are no patterns on the clothing. In contrast, a person wearing pants of one color and a shirt with a pattern would be more complex due to the amount of detail displayed. To best represent the system at this point, some embodiments utilize a vectorization method based on the average complexity of the scene and objects. More complex scenes require an appearance vector 171 with more values to represent the objects. In less complex and detailed scenes, an appearance vector 171 with less values can be used to adequately represent the objects.

A behavior vector 172 for a particular object within video frames 145, in general, is a mathematical representation of the behavior or movement of the particular object. In some embodiments, behavior vectors 172 are generated for objects that are tracked over time (e.g., over multiple video frames 145) and correspond to the aggregate behavior of the object. Behavior vectors 172 are similar to appearance vectors 171 in that they are a one-dimensional array of numbers. Each value within behavior vector 172 represents an aspect of the behavior of the object. For example, the various behavior aspects encoded within behavior vectors 172 may include: the inclination of an object to move or to be stationary; if the object is moving, does the object move in straight lines and smooth curves or does the object move in erratic motion patterns; the general speed with which the object moves, and the like. As a specific example, a car in motion would have a medium value for movement since in some cases cars are driving and in other cases cars are parked. A car may have a low value in the vector index that corresponds to erratic movement since a car generally moves in straight lines and smooth curves. A forklift on the other hand, while also being a type of vehicle, may have an erratic movement value that is higher than a car since forklifts tend to move forward, twist, and move backwards when moving pallets.

In some embodiments, behavior vectors 172 are generated by clustering module 122 by encoding the movement behavior (e.g., speed, agility, etc.) of the object over time in three dimensions. As each object is encoded with an appearance vector 171, objects can be tracked frame to frame. Clustering module 122 may combine data from appearance vectors 171 with position data for an object to measure and encode the movement of the object over time in the form of tracks (i.e., movement over time). Metrics such as the speed and direction can be calculated at a moment in time from each of the tracks and encoded as object data. In some embodiments, movement behavior can also be aggregated over time. Metrics such as the propensity of an object to move with rectilinear motion versus more erratic motion can be measured over time and attached as metadata to the detected object. For example, forklifts tend to have erratic motion when operating in a warehouse (e.g., forklifts travel back and forth and make numerous turns to move freight from one area of the warehouse to another). On the other hand, automobiles generally move in a straight line or in smooth curves. The tendency of each detected object can be attached to the specific detected object and then also combined with other like objects to create a composite metric of the class of object.

A shape vector 173 for a particular object within video frames 145, in general, is a mathematical representation of the size or shape of the particular object. In some embodiments, clustering module 122 determines the height, width, and depth of each object and converts these values into comparable values. In some embodiments, each detected object in video frame 145 has a contour, which is a line segment that follows the outline of the object. Some embodiments of clustering module 122 use the contours of each object to calculate Hu Moments for the object (e.g., seven floating point numbers). In some embodiments, Hu Moments are generated for every detected object and are used to compare any object shape to find other objects of similar shape.

In some embodiments, clustering module 122 encodes the size/shape of each detected object in three dimensions. To do so, some embodiments use the size and position of the object masks 310 and the calibration of video camera 150 to calculate the size, shape, and position of the object in three-dimensional space. In some embodiments, this information is encoded as latitude, longitude, and elevation for position, and is encoded as silhouette, width, height, and depth for shape/size.

In some embodiments, when an object is extracted by extraction module 121, the shape of the object is based initially on the shape of the object in the video frame 145 that makes it separate from something else, or something starts or stops, or something that begins. For example, an object which begins to move would have its shape first be defined from the frame where it is static, while a car that moves into the frame and parks would have its shape first defined in the frame where it is moving. As these objects have persistence, their shapes can be redefined and or a collective shape measurement calculated at any point during their lifespan or even after they are created. In general, different types of objects have different shapes. For example, people have a different shape from cars which have a different shape from forklifts. In some embodiments, object shapes are stored as line segments, and contours and can be compared to each other using techniques like Hu Moments to find other shapes that are similar.

In some embodiments, image analysis and labeling module 120 stores the coordinates of the bounding box 510 for that shape. In some embodiments, the object shape/geometry and the coordinates of the bounding box 510 for object may be paired together. Objects can then be visualized by either their shape or the bounding box 510 created from their shape. In some embodiments, the coordinates of bounding box 510 are taken from the frame and the bounding box 510 is aligned to the x/y axes of the frame. The x/y coordinates of the objects may be important because similar objects tend to stay on similar paths. For example, cars generally drive on roads while people generally walk on sidewalks. For a video camera 150 that is stationary, those areas (e.g., roads and sidewalks) will always be in the same position in the image such that the objects (e.g., cars and people) will generally follow the same two-dimensional paths.

Composite vectors 174 are vectors that are generated by image analysis and labeling module 120 by combining two or more of an appearance vector 171, a behavior vector 172, and a shape vector 173 for a particular identified object within video frames 145. In some embodiments, each composite vector 174 may be a linear combination of an appearance vector 171, a behavior vector 172, and a shape vector 173 for each particular identified object within video frames 145. For example, if appearance vector 171 is 1024 values, behavior vector 172 is 16 values, and shape vector 173 is 8 values, then the corresponding composite vector 174 would be 1024+16+8=1048 values.

The linear combination of appearance vectors 171, behavior vectors 172, and shape vectors 173 produces a composite vector 174 that may be used by clustering module 122 (e.g., using vector clustering algorithms) to determine similar vectors. More specifically, composite vectors 174 can be directly compared, and not only similar vectors be "clustered" together, but a similarity value (i.e., a single value which denotes the similarity between two vectors) can be calculated and used to determine similarity. Clustering module 122 may utilize any appropriate technique to calculate similarity scores. For example, clustering module 122 may utilize cosine distance or Euclidian distance. In some embodiments, clustering module 122 determines that two objects are similar if the calculated similarity score between composite vectors 174 for the two objects is above a predetermined similarity value. After clustering, a user can select the clusters of interest, or image analysis and labeling system 100 may automatically determine the interesting clusters based on object vectors 170. Both are discussed in more detail below.

In some embodiments, the clustering of the identified objects within video frames 145 based on similarity can be performed based on user selection. In these embodiments, the user can identify the objects of interest using, for example, client system 130. This may include selecting the same objects at different points in time. In some embodiments, the objects selected by the user are then clustered with similar objects in order to identify other objects of interest (e.g., by calculating similarity scores between the selected object and other objects of interest and then selecting the other objects whose calculated similarity scores meet a predetermined similarity value). For example, if the objects of interest were all moving red cars, the objects would be clustered with other moving red car objects. This can be performed multiple times with different objects of interest either clustered exclusively or non-exclusively.

In some embodiments, the clustering of the identified objects within video frames 145 based on similarity can be performed based on automated clustering. In these embodiments, image analysis and labeling system 100 automatically determines the interesting clusters based on object vectors 170. In some embodiments, if there is no user-selection of objects of interest, image analysis and labeling system 100 performs the clustering automatically using a binary split method of separating the data into the two best but separate clusters and then repeating on each of the clusters, thereby breaking the objects down into different groups and subgroups. These groupings can then be presented to the user (e.g., via a GUI on client system 130). The user may then apply labels (e.g., user-editable label 810) to the grouping as desired.

After determining the plurality of similar objects, some embodiments of clustering module 122 display images of one or more of the plurality of similar objects in a graphical user interface (e.g., on client system 130). For example, FIG. 8 illustrates object images 180 of two objects (i.e., forklifts) that have been determined to be similar (e.g., by comparing composite vectors 174 for the two objects). While FIG. 8 illustrates two object images 180, object images 180 for any number of similar objects may be displayed.

FIG. 9 is a chart illustrating a method 900 for grouping objects based on similarity, according to particular embodiments. In some embodiments, method 900 may be performed by image analysis and labeling module 120 (e.g., clustering module 122 within image analysis and labeling module 120) of image analysis and labeling system 100. At step 910, method 900 accesses a plurality of video frames of a video. In some embodiments, the video frames are video frames 145. In some embodiments, the video is captured by a camera (e.g., video camera 150) located within a physical environment.

At step 920, method 900 identifies a plurality of objects from the plurality of video frames. In some embodiments, step 920 is performed by extraction module 121 using one or more steps of method 700. In some embodiments, step 920 includes generating a plurality of masks. In some embodiments, the plurality of masks are masks 310. In some embodiments, each mask includes a set of neighboring pixels that are determined to be related. In some embodiments, step 920 includes extracting the plurality of objects from the plurality of video frames based on the generated plurality of masks.

At step 930, method 900 generates a plurality of composite vectors for the plurality of objects. In some embodiments, the composite vectors are composite vectors 174. In some embodiments, step 930 includes generating a plurality of vectors for each particular object of the plurality of objects extracted from the plurality of video frames. In some embodiments, the plurality of vectors that are generated for each particular object of the plurality of objects extracted from the plurality of video frames includes an appearance vector, a behavior vector, and a shape vector. In some embodiments, the appearance vector is a mathematical representation of the appearance of the particular object, the behavior vector is a mathematical representation of the behavior or movement of the particular object, and the shape vector is a mathematical representation of the size or shape of the particular object. In some embodiments, the appearance vectors are appearance vectors 171, the behavior vectors are behavior vectors 172, and the shape vectors are shape vectors 173. In some embodiments, step 930 includes generating a particular composite vector for each particular object by combining the plurality of vectors for the particular object. In some embodiments, the combination of the plurality of vectors to generate the composite vectors is a linear combination.

At step 940, method 900 determines, using the composite vectors for the plurality of objects, a plurality of similar objects. In some embodiments, step 940 includes calculating a plurality of similarity scores for the plurality of objects using the composite vectors for the plurality of objects of step 930. In some embodiments, each similarity score denotes the similarity between two of the plurality of objects.

In some embodiments, step 940 includes accessing a user-selection of a selected object of the plurality of objects. In these embodiments, step 940 includes calculating similarity scores between the selected object and other objects of the plurality of objects. In addition, step 940 includes selecting the other objects of the plurality of objects whose calculated similarity scores with the selected object meets a predetermined similarity value (e.g., is greater than or equal to a predetermined similarity threshold).

In some embodiments, step 940 is performed automatically without any user input. In these embodiments, step 940 includes automatically calculating similarity scores between each particular object and every other object of the plurality of objects. In addition, step 940 includes clustering the plurality of objects based on the calculated similarity scores.

At step 950, method 900 displays images of one or more of the plurality of similar objects in a graphical user interface. In some embodiments, the images are object images 180 that correspond to the similar objects. In some embodiments, step 950 additionally includes displaying a user-editable label for the plurality of similar objects in the graphical user interface. In some embodiments, the user-editable label is user-editable label 810. After step 950, method 900 may end.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method including the particular steps of the method of FIG. 9, this disclosure contemplates any suitable method including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Indexing module 123 may be a software module/application utilized by computing system 110 to create and maintain an image object index (e.g., image object index 155) that may be used to identify and extract objects from video frames 145 across multiple locations, as described herein. Indexing module 123 represents any suitable set of instructions, logic, or code embodied in a computer-readable storage medium. For example, indexing module 123 may be embodied in memory 115, a disk, a CD, or a flash drive. In particular embodiments, indexing module 123 may include instructions (e.g., a software application) executable by a computer processor to perform some or all of the functions described herein.

In general, indexing module 123 indexes data (e.g., object vectors 170) about objects extracted from video frames 145 taken from multiple physical environments 160 for future use. In some embodiments, object vectors 170 are indexed into image object index 155. By utilizing image object index 155, image analysis and labeling system 100 is able to quickly and efficiently identify and label objects from multiple sites without requiring users to manually train image analysis and labeling system 100 (e.g., by manually drawing boxes around objects within video frames 145). For example, video frames 145A may be captured from a first physical environment 160A and analyzed by image analysis and labeling system 100. In doing so, image analysis and labeling system 100 may identify and label multiple forklifts within first physical environment 160A. The identified forklifts will have associated object vectors 170 that correspond to the visual appearance of the forklifts (e.g., their color, etc.), their behavior (e.g., how fast they move, how nimble they are, whether they zig-zag or travel in a straight line, etc.), and their shapes. The object vectors 170 of the identified forklifts may be indexed by indexing module 123 into image object index 155. In some embodiments, indexing module 123 may analyze the stored object vectors 170 within image object index 155 to determine a general embedding vector associated with the group of similar objects (e.g., a general embedding vector (appearance, behavior, size, shape, etc.) that represents the group of similar objects). In other words, some embodiments of indexing module 123 strive to determine the representative/embedding vector that could represent all the objects in a cluster of similar objects.

Once indexing module 123 creates image object index 155, the knowledge and information within image object index 155 can be transferred and applied to newly-discovered objects from a second physical environment 160B that are similar but have slightly different properties. For example, a user may simply submit a query such as "show me people, forklifts, and pallets in my new warehouse." Because the master image object index 155 has already been created from other warehouses (e.g., first physical environment 160A), and image object index 155 includes labels attached to identified objects, image analysis and labeling system 100 can ingest video from multiple cameras in the new warehouse and automatically identify the relevant objects within the video. More specifically, clusters can be compared against the global image object index 155 to provide outputs that indicate a set of people, forklifts, and pallets in the new warehouse.

FIG. 10 is a chart illustrating a method 1000 for utilizing an index to identify and label objects from video frames across multiple locations, according to particular embodiments. In some embodiments, method 1000 may be performed by image analysis and labeling module 120 (e.g., indexing module 123 of image analysis and labeling module 120) of image analysis and labeling system 100. At step 1010, method 1000 accesses a plurality of first video frames of a first video captured at a first physical location. In some embodiments, the first video frames are video frames 145A captured by video camera 150A at a first physical environment 160A.

At step 1020, method 1000 identifies a plurality of first objects from the plurality of first video frames. In some embodiments, step 1020 is performed by extraction module 121 using one or more steps of method 700. In some embodiments, step 1020 includes generating a plurality of first masks. In some embodiments, the plurality of first masks are masks 310. In some embodiments, each first mask includes a set of neighboring pixels that are determined to be related. In some embodiments, step 1020 includes extracting the plurality of first objects from the plurality of first video frames based on the generated plurality of first masks.

At step 1030, method 1000 generates a plurality of first composite vectors for the plurality of first objects. In some embodiments, the first composite vectors are linear combinations of a plurality of vectors generated for each particular first object. In some embodiments, the plurality of vectors include: an appearance vector that is a mathematical representation of the appearance of the particular first object; a behavior vector that is a mathematical representation of the behavior or movement of the particular first object; and a shape vector that is a mathematical representation of the size or shape of the particular first object.

At step 1040, method 1000 stores the plurality of first composite vectors in an index. In some embodiments, the index is image object index 155. At step 1050, method 1000 accesses a plurality of second video frames of a second video captured at a second physical location. In some embodiments, the second video frames are video frames 145B captured by video camera 150B at second physical environment 160B.

At step 1060, method 1000 identifies a plurality of second objects from the plurality of second video frames. In some embodiments, step 1020 is performed by extraction module 121 using one or more steps of method 700. In some embodiments, step 1020 includes generating a plurality of second masks. In some embodiments, the plurality of second masks are masks 310. In some embodiments, each second mask includes a set of neighboring pixels that are determined to be related. In some embodiments, step 1020 includes extracting the plurality of second objects from the plurality of second video frames based on the generated plurality of second masks.

At step 1070, method 1000 generates a plurality of second composite vectors for the plurality of second objects. In some embodiments, the second composite vectors are linear combinations of a plurality of vectors generated for each particular second object. In some embodiments, the plurality of vectors include: an appearance vector that is a mathematical representation of the appearance of the particular second object; a behavior vector that is a mathematical representation of the behavior or movement of the particular second object; and a shape vector that is a mathematical representation of the size or shape of the particular second object.

At step 1080, method 1000 determines, using the index and the plurality of second composite vectors for the plurality of second objects, a plurality of similar objects. In some embodiments, step 1080 includes calculating a plurality of similarity scores for the plurality of second objects using the index. In some embodiments, each similarity score denotes the similarity between the plurality of second objects and objects within the index.

In some embodiments, step 1080 includes accessing a user-selection of a selected second object of the plurality of second objects. In addition, step 1080 may include calculating similarity scores between the selected second object and other objects within the index and selecting the other objects within the index whose calculated similarity scores with the selected second object meets a predetermined similarity value.

In some embodiments, step 1080 is performed automatically without any user input. In these embodiments, step 1080 includes automatically calculating similarity scores between each particular second object and every other object within the index. In addition, step 1080 may include clustering the objects based on the calculated similarity scores.

At step 1090, method 1000 displays images of one or more of the plurality of similar objects in a graphical user interface. In some embodiments, the images are object images 180 that correspond to the similar objects. In some embodiments, step 1090 additionally includes displaying a user-editable label for the plurality of similar objects in the graphical user interface. In some embodiments, the user-editable label is user-editable label 810. After step 1090, method 1000 may end.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method including the particular steps of the method of FIG. 10, this disclosure contemplates any suitable method including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

FIG. 11 illustrates an example computer system 1100 that can be utilized to implement aspects of the various methods and systems presented herein, according to particular embodiments. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example, and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example, and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example, and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example, and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these T/O devices. T/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example, and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in the included FIGURES may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system comprising:
a camera;
one or more memory units; and
one or more computer processors communicatively coupled to the one or more memory units and configured to perform operations comprising:
    access a video frame of a video generated by the camera when viewing a physical environment;
    analyze the video frame of the video in order to generate a plurality of masks, each mask comprising a set of neighboring pixels that are determined to be related;
    extract a plurality of objects from the video frame based on the generated plurality of masks;
    recursively extract a plurality of nested objects from the video frame based on the generated plurality of masks, each particular nested object being related to a particular one of the plurality of objects;
    create a plurality of object images by:
        combining the plurality of masks of the plurality of objects with image data of the video frame; and
        combining the plurality of masks of the plurality of nested objects with the image data of the video frame; and
    display one or more of the plurality of object images in a graphical user interface.

2. The system of claim 1, wherein displaying the one or more of the plurality of object images in the graphical user interface is based on a user input, the user input indicating a mask level of the plurality of object images.

3. The system of claim 1, wherein analyzing the video frame of the video in order to generate the plurality of masks comprises utilizing an image segmentation algorithm.

4. The system of claim 1, wherein each mask comprises a binary bitmap image.

5. The system of claim 1, wherein extracting the plurality of objects from the video frame based on the generated plurality of masks comprises:
    identifying each particular mask of the plurality of masks as an object of the plurality of objects; and
    filtering the plurality of objects to remove any objects determined to be background objects.

6. The system of claim 1, the operations further comprising displaying a bounding box around each of the plurality of objects and each of the plurality of nested objects on the video frame.

7. The system of claim 1, wherein each of the plurality of object images comprises a cropped image of a corresponding object or nested object on a solid-color background.

8. A method by a computing system for identifying and extracting objects from images, the method comprising:
    accessing a video frame of a video generated by a camera when viewing a physical environment;
    analyzing the video frame of the video in order to generate a plurality of masks, each mask comprising a set of neighboring pixels that are determined to be related;
    extracting a plurality of objects from the video frame based on the generated plurality of masks;
    recursively extracting a plurality of nested objects from the video frame based on the generated plurality of masks, each particular nested object being related to a particular one of the plurality of objects;
    creating a plurality of object images by:
        combining the plurality of masks of the plurality of objects with image data of the video frame; and
        combining the plurality of masks of the plurality of nested objects with the image data of the video frame; and
    displaying one or more of the plurality of object images in a graphical user interface.

9. The method of claim 8, wherein displaying the one or more of the plurality of object images in the graphical user interface is based on a user input, the user input indicating a mask level of the plurality of object images.

10. The method of claim 8, wherein analyzing the video frame of the video in order to generate the plurality of masks comprises utilizing an image segmentation algorithm.

11. The method of claim 8, wherein each mask comprises a binary bitmap image.

12. The method of claim 8, wherein extracting the plurality of objects from the video frame based on the generated plurality of masks comprises:
    identifying each particular mask of the plurality of masks as an object of the plurality of objects; and
    filtering the plurality of objects to remove any objects determined to be background objects.

13. The method of claim 8, further comprising displaying a bounding box around each of the plurality of objects and each of the plurality of nested objects on the video frame.

14. The method of claim 8, wherein each of the plurality of object images comprises a cropped image of a corresponding object or nested object on a solid-color background.

15. One or more computer-readable non-transitory storage media embodying instructions that, when executed by a processor, cause the processor to perform operations comprising:
    access a video frame of a video generated by a camera when viewing a physical environment;
    analyze the video frame of the video in order to generate a plurality of masks, each mask comprising a set of neighboring pixels that are determined to be related;
    extract a plurality of objects from the video frame based on the generated plurality of masks;
    recursively extract a plurality of nested objects from the video frame based on the generated plurality of masks, each particular nested object being related to a particular one of the plurality of objects;
    create a plurality of object images by:
        combining the plurality of masks of the plurality of objects with image data of the video frame; and
        combining the plurality of masks of the plurality of nested objects with the image data of the video frame; and
    display one or more of the plurality of object images in a graphical user interface.

16. The one or more computer-readable non-transitory storage media of claim 15, wherein displaying the one or more of the plurality of object images in the graphical user interface is based on a user input, the user input indicating a mask level of the plurality of object images.

17. The one or more computer-readable non-transitory storage media of claim 15, wherein analyzing the video frame of the video in order to generate the plurality of masks comprises utilizing an image segmentation algorithm.

18. The one or more computer-readable non-transitory storage media of claim 15, wherein each mask comprises a binary bitmap image.

19. The one or more computer-readable non-transitory storage media of claim 15, wherein extracting the plurality of objects from the video frame based on the generated plurality of masks comprises:
   identifying each particular mask of the plurality of masks as an object of the plurality of objects; and
   filtering the plurality of objects to remove any objects determined to be background objects.

20. The one or more computer-readable non-transitory storage media of claim 15, the operations further comprising displaying a bounding box around each of the plurality of objects and each of the plurality of nested objects on the video frame.

\* \* \* \* \*